(12) United States Patent　　　(10) Patent No.:　US 12,631,570 B1
Al Ahmad et al.　　　　　　　　　　(45) Date of Patent:　　May 19, 2026

(54) AQUEOUS SOLUTION CHARACTERIZATION USING REFLECTION COEFFICIENT SLOPE ANALYSIS

(71) Applicants: United Arab Emirates University, Al Ain (AE); University of Khorfakkan, Sharjah (AE)

(72) Inventors: Mahmoud F. Y Al Ahmad, Al Ain (AE); Ali Hilal Alnaqbi, Sharjah (AE)

(73) Assignees: United Arab Emirates University, Al Ain (AE); University of Khorfakkan, Sharjah (AE)

( * ) Notice: Subject to any disclaimer, the term of this patent is extended or adjusted under 35 U.S.C. 154(b) by 0 days.

(21) Appl. No.: 19/332,540

(22) Filed: Sep. 18, 2025

(51) Int. Cl.
　　　*G01N 22/00*　　　　(2006.01)
(52) U.S. Cl.
　　　CPC ..................................... *G01N 22/00* (2013.01)
(58) Field of Classification Search
　　　CPC ...................................................... G01N 22/00
　　　See application file for complete search history.

(56) References Cited

U.S. PATENT DOCUMENTS 8,947,102 B1 *　2/2015　Evett .................... G01N 27/223
　　　　　　　　　　　　　　　　　　　　324/634
2010/0292936 A1　11/2010　Jepsen
2016/0313260 A1　10/2016　Meaney et al.
2019/0212285 A1　7/2019　Chiao

FOREIGN PATENT DOCUMENTS

JP　　　2021173709 A　*　11/2021　............. G01N 22/00

OTHER PUBLICATIONS

English translation JP2021173709A (Year: 2021).*
Cheng et al. Development of Low Cost Microwave Detection System for Salinity and Sugar Detection, IJMME-IJENS vol. 14 No. 05, pp. 59-71, Oct. 2014 (Year: 2014).*
Rahman et al. Salinity and Sugar Content Detection by Wideband Microwave-Based Patch Antenna Sensor , https://doi.org/10.1155/jece/4813865 (Year: 2025).*

* cited by examiner

*Primary Examiner* — Eman A Alkafawi
*Assistant Examiner* — Courtney G McDonnough
(74) *Attorney, Agent, or Firm* — Boyle Fredrickson S.C.

(57)　　　　　　　　ABSTRACT

Methods and systems for analyzing aqueous solutions. A method includes transmitting a set of excitation signals to a probe submerged in an aqueous solution, the signals comprising a plurality of distinct frequencies within a frequency range, and receiving a set of reflected signals from the probe. The method includes determining a rate of change of a reflection coefficient magnitude with respect to frequency based on the set of reflected signals. The method further includes identifying at least one characteristic of the aqueous solution based on the determined rate of change. Disclosed systems are configured to perform such a method.

18 Claims, 9 Drawing Sheets

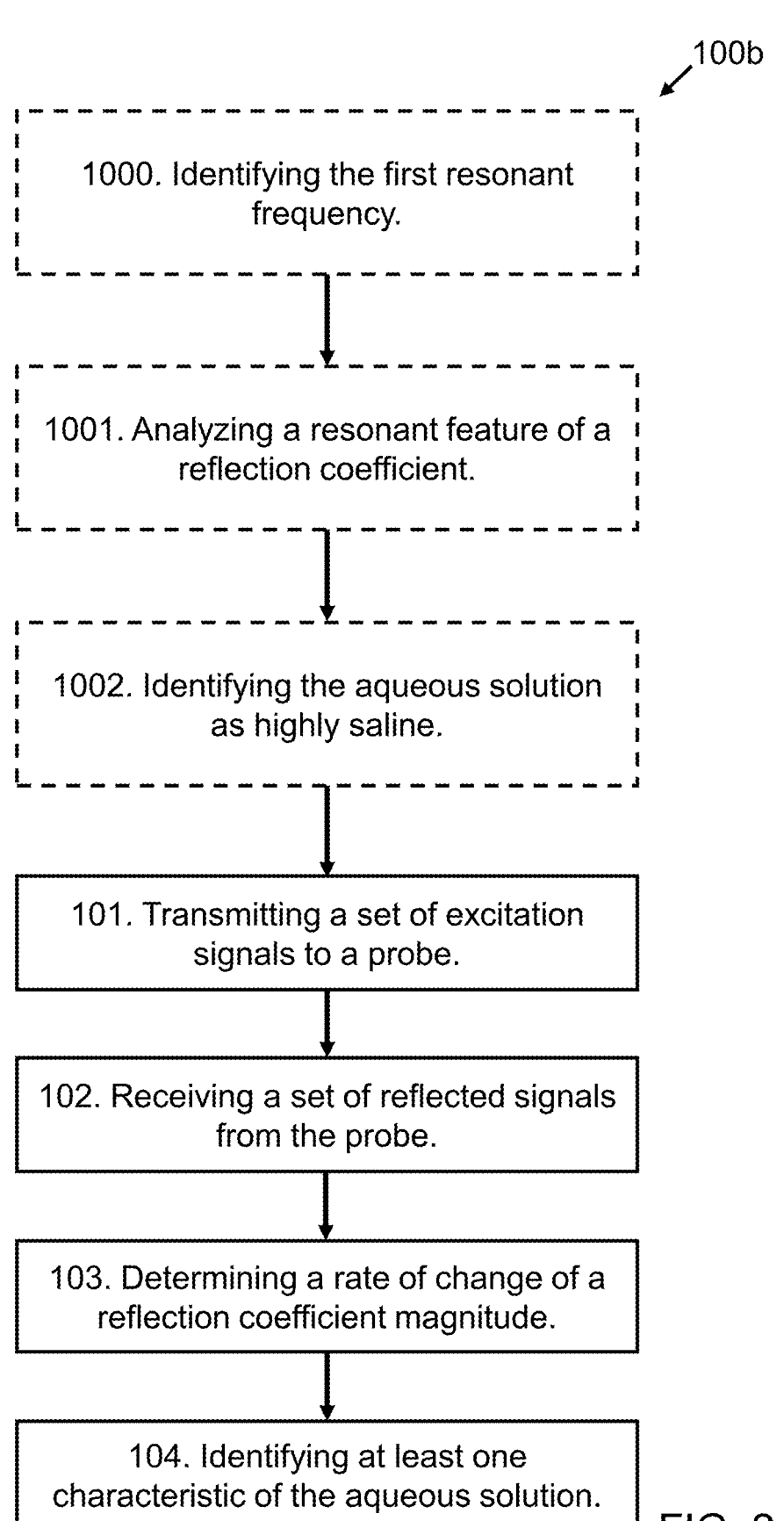

100b

1000. Identifying the first resonant frequency.

1001. Analyzing a resonant feature of a reflection coefficient.

1002. Identifying the aqueous solution as highly saline.

101. Transmitting a set of excitation signals to a probe.

102. Receiving a set of reflected signals from the probe.

103. Determining a rate of change of a reflection coefficient magnitude.

104. Identifying at least one characteristic of the aqueous solution.

FIG. 2

AQUEOUS SOLUTION CHARACTERIZATION USING REFLECTION COEFFICIENT SLOPE ANALYSIS

TECHNICAL FIELD

The present disclosure relates to analyzing aqueous solutions, and more particularly to methods and systems for analyzing aqueous solutions based on identifying characteristics associated with certain frequency responses.

BACKGROUND

Analysis of aqueous solutions is often useful for determining safety and quality. Aqueous solutions may be analyzed to assess their suitability for particular uses. For example, an aqueous solution may be analyzed to assess its potability. Certain analysis techniques may be cumbersome or unsuited to rapid, cost-efficient assessment that is beneficial to support the motivations for analysis.

SUMMARY

Accordingly, there is a need for systems and methods for analyzing aqueous solutions which mitigate, alleviate or address the shortcomings existing and provide for rapid, in-situ characterization of aqueous solutions, offer improved specificity over conventional electronic sensors, and which allow for robust analysis even in solutions where resonant features may be attenuated.

A method is disclosed. The method may include transmitting, such as from an analyzer module, a set of excitation signals to a probe, such as a probe submerged in an aqueous solution, wherein the set of excitation signals are configured to cause the probe to generate an electrical field at a plurality of distinct frequencies, such as within a frequency range being below a first resonant frequency. The method may include receiving, such as at the analyzer module, a set of reflected signals from the probe, such as reflected signals indicative of an interaction between the electrical field and the aqueous solution at the plurality of distinct frequencies. The method may include determining, such as by the analyzer module, a rate of change of a reflection coefficient magnitude with respect to frequency, such as a rate of change based at least in part on processing the set of reflected signals from the probe. The method may further include identifying, such as by the analyzer module, at least one characteristic of the aqueous solution, such as a characteristic based on the determined rate of change.

Further, a system is disclosed. The system may include a memory storing instructions and a processor communicatively coupled to the memory. The processor may be configured to execute the instructions to cause transmission of a set of excitation signals to a probe submerged in an aqueous solution, such as signals configured to cause the probe to generate an electrical field at a plurality of distinct frequencies within a frequency range being below a first resonant frequency. The processor may be further configured to receive a set of reflected signals from the probe indicative of an interaction between the electrical field and the aqueous solution, determine a rate of change of a reflection coefficient magnitude with respect to frequency based on the set of reflected signals, and identify at least one characteristic of the aqueous solution based on the determined rate of change.

A further method is disclosed. The method may be for generating a classification model for an aqueous solution analyzer module. The method may include obtaining a plurality of reference solutions, each having at least one known reference characteristic. For each reference solution, the method may include transmitting a set of excitation signals to a probe submerged in the reference solution at a plurality of distinct frequencies below a first resonant frequency, receiving a set of reflected signals, and determining a corresponding reference rate of change of a reflection coefficient magnitude with respect to frequency. The method may further include generating the classification model, such as by correlating the determined reference rate of change for each reference solution with the known reference characteristic of the respective reference solution, and storing the classification model in a memory.

It is an advantage of the present disclosure that an analysis based on a rate of change of a reflection coefficient in a sub-resonant frequency range may provide robust characterization of an aqueous solution, even in circumstances where analysis of a resonant feature is compromised, such as in highly saline solutions.

Further, it is an advantage of the present disclosure that the determined rate of change may provide a more nuanced characterization of a solution's properties compared to conventional bulk measurements.

It is a further advantage of the present disclosure that a classification model may be generated from empirical data using known reference solutions, enabling the system to be trained to identify specific characteristics or contaminants of interest, such as heavy metals, nitrates, or chlorides.

Further, it is an advantage of the present disclosure that multiple, separate analyzer modules may be individually calibrated by generating a respective classification model locally using common reference solutions, promoting consistent and reliable analysis across different devices.

It is a further advantage of the present disclosure that the system may provide for rapid, in-situ analysis of an aqueous solution without the use of chemical reagents or transport of samples to a laboratory.

Further, it is an advantage of the present disclosure that analysis of a resonant feature may be used as a complementary method to identify particular conditions, such as high salinity, based on the degree of attenuation of the feature as compared to a reference feature.

BRIEF DESCRIPTION OF THE DRAWINGS

The drawings illustrate various examples within the scope of the present disclosure. These examples are provided to exemplify different aspects and aid in understanding the disclosure. It should be understood that, while the disclosure has been illustrated and described in accordance with preferred examples, variations and modifications may be made without departing from the scope of the disclosure as defined by the claims.

FIG. 2 is a flowchart illustrating another exemplary method for identifying at least one characteristic of an aqueous solution.

DETAILED DESCRIPTION

Aqueous solutions may be analyzed based on characteristics associated with certain frequency responses, which may be observed or measured rapidly and in-situ. By contrast, other analysis techniques may involve laboratory instrumentation, chemical reagents, and/or significant processing time. While electronic sensors exist for in-situ measurements, they often provide only a general characterization, such as overall conductivity or total dissolved solids, which may not be sufficient to identify specific types of contaminants or to classify a solution with a high degree of confidence. Further, certain electrical measurement techniques that rely on analyzing resonant features of a probe can be rendered ineffective in highly conductive or saline solutions where such resonant features become substantially attenuated or completely obscured.

The present disclosure is directed to addressing the challenges inherent in conventional aqueous solution analysis. While laboratory methods like ICP-MS provide high accuracy, they are ill-suited for rapid, on-site deployment. Conversely, existing in-situ electronic sensors, such as those measuring bulk conductivity or Total Dissolved Solids (TDS), often lack the specificity to distinguish between different types of ionic contaminants, thereby providing an incomplete assessment of water quality or safety. Furthermore, a significant technical hurdle exists for measurement techniques that rely on analyzing the resonant frequency response of a probe. In solutions with high ionic strength, such as seawater or industrial brines, the resonant feature can become severely attenuated or completely obscured, rendering the analysis ineffective and creating a critical gap in monitoring capabilities for such environments.

The systems and methods disclosed herein provide a solution by interrogating the aqueous solution in a sub-resonant frequency domain. In one or more examples, a system comprises an analyzer module operatively coupled to a probe, such as an open-ended coaxial probe, which is submerged in the solution under test. The analyzer transmits a set of excitation signals at a plurality of frequencies below the probe's first resonant frequency and measures the corresponding reflected signals. The inventors have discovered that the rate of change of the reflection coefficient's magnitude with respect to frequency in this sub-resonant region serves as a highly sensitive and robust proxy for the solution's dielectric properties and, consequently, its composition. This approach yields a distinct advantage over the prior art by providing a reliable characterization metric even in highly conductive solutions where resonant features are attenuated. By analyzing this rate of change, the system can rapidly determine characteristics such as TDS concentration, classify the solution into safety categories, or, when used with a pre-generated classification model, identify specific contaminants with a high degree of confidence.

Figure 1:
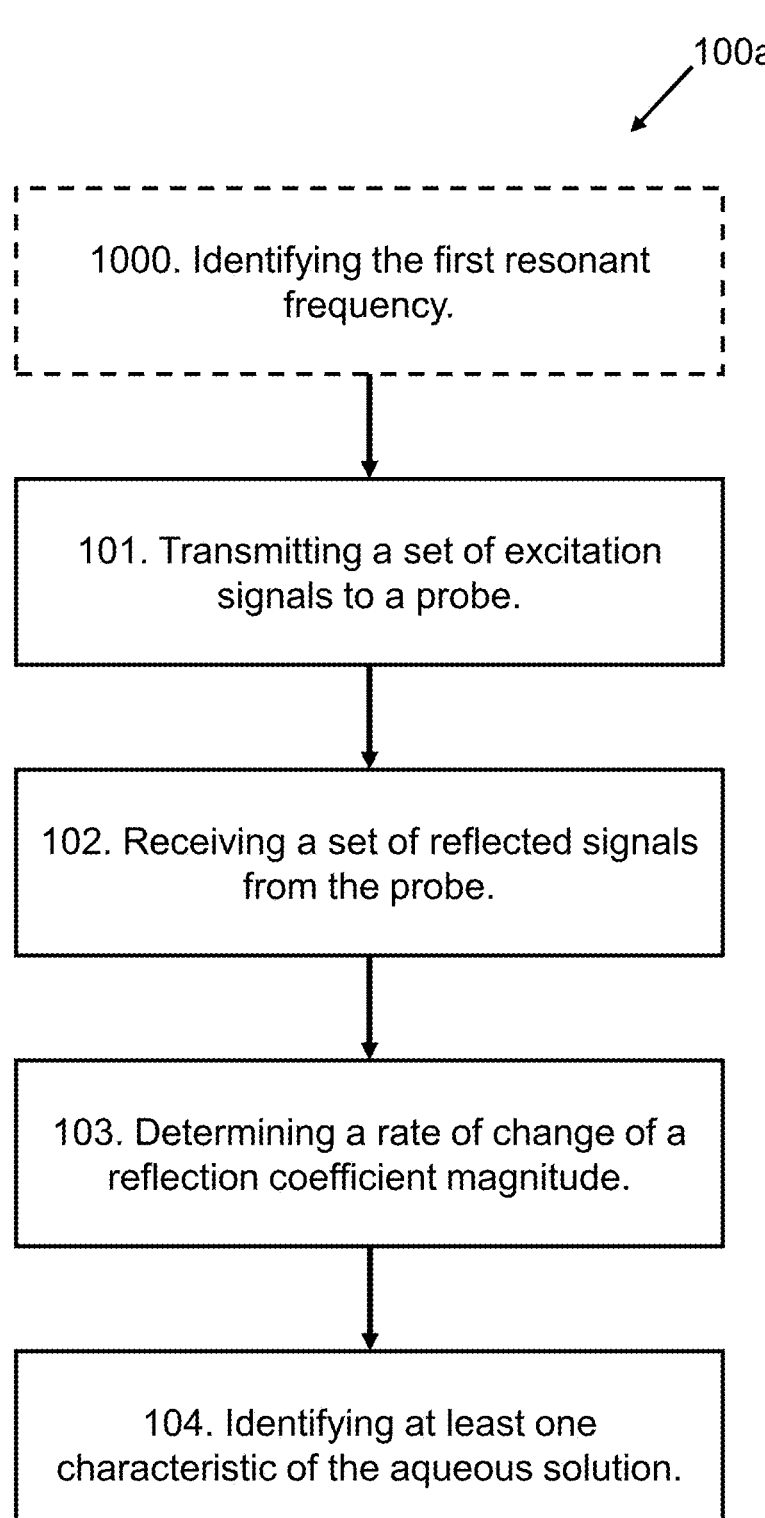
FIG. 1 is a flowchart illustrating an exemplary method for identifying at least one characteristic of an aqueous solution.

FIG. 1 is a flowchart illustrating an exemplary method 100*a* for identifying at least one characteristic of an aqueous solution. The method 100*a* is performed, for example, by an analyzer module operatively coupled to a probe. The method 100*a* may be initiated by submerging the probe into an aqueous solution to be analyzed.

In one or more examples, the method 100*a* may include identifying a first resonant frequency of the probe system. This identification may be performed while the probe is arranged in the aqueous solution under test, a reference solution (e.g., deionized water), or both. Identifying the first resonant frequency serves to define an operational frequency range for subsequent steps and actions.

As illustrated in FIG. 1, the method 100*a* includes transmitting 101 a set of excitation signals from the analyzer module to the probe, which is submerged in the aqueous solution. The set of excitation signals is configured to cause the probe to generate an electrical field at a plurality of distinct frequencies. The frequency range of these signals may be selected to be below the first resonant frequency.

The analyzer module may receive 102 a set of reflected signals from the probe. This set of reflected signals is indicative of the interaction between the electrical field generated by the probe and the aqueous solution at the aforementioned plurality of distinct frequencies. The properties of the reflected signals are modulated by the electrical properties (e.g., conductivity, permittivity) of the aqueous solution.

The analyzer module may process the set of reflected signals to determine 103 a rate of change of a reflection coefficient magnitude with respect to frequency. The reflection coefficient represents the ratio of the reflected signal to the transmitted signal, and its magnitude provides a measure of the impedance mismatch between the probe and the aqueous solution. The rate of change of this magnitude with respect to frequency has been found to be a sensitive indicator of the solution's properties.

The analyzer module may identify 104 at least one characteristic of the aqueous solution based on the determined 103 rate of change. This identification can be performed in several ways.

In one or more examples, the identified characteristic is a Total Dissolved Solids (TDS) concentration, which is determined directly from the calculated rate of change. Based on the determined TDS concentration, the aqueous solution can, in further examples, be assigned to one safety category from a plurality of safety categories, such as a potable category and a non-potable category.

In one or more examples, identifying 104 the characteristic may further comprise normalizing the determined rate of change. This is accomplished by comparing it against a reference rate of change that has been predetermined for a reference solution, thereby providing a relative measure of the solution's properties.

In one or more examples, identifying 104 may involve a more sophisticated analysis using a classification model. The determined rate of change is input into the classification model, which stores data indicative of a correlation between a plurality of reference rates of change and a corresponding plurality of known reference characteristics. The model then outputs the at least one characteristic of the aqueous solution by mapping the determined rate of change to the stored data. For example, the known characteristics of the reference solutions stored in the model may comprise concentrations of specific ionic contaminants. The identified characteristic could thereby be the presence of at least one of these specific ionic contaminants above a predefined safety limit. Such ionic contaminants may include, without limitation, a heavy metal, a nitrate, and a chloride.

FIG. 2 is a flowchart illustrating another exemplary method 100b for identifying at least one characteristic of an aqueous solution. Method 100b incorporates additional optional preliminary actions for characterizing the solution based on its resonant behavior before proceeding with the primary analysis at sub-resonant frequencies.

The method 100b may optionally commence with a series of preliminary characterization actions 1000-1002. For example, a first resonant frequency of the probe arranged in the aqueous solution may be identified 1000 prior to the transmission 101 of the set of excitation signals.

Optionally, a resonant feature of a reflection coefficient is analyzed 1001 as a function of frequency. This analysis 1001 may be performed over a frequency interval that encompasses the identified 1000 first resonant frequency. The analysis 1001 may focus on characteristics of the resonance, such as its magnitude, quality factor (Q-factor), or center frequency.

Based on the analysis 1001, a preliminary identification 1002 of the aqueous solution may be performed. In one or more examples, the method 100b comprises identifying 1002 the aqueous solution as highly saline when the resonant feature is determined to be substantially attenuated compared to a reference feature. The reference feature would typically be identified for the probe arranged in a reference aqueous solution, such as deionized water. This preliminary identification 1002 is particularly useful for screening solutions with very high ionic concentrations that might otherwise saturate the measurement system in the primary analysis phase.

A resonant feature may be considered substantially attenuated when its defining characteristics are diminished to a degree that precludes repeatable and reliable identification of the resonant frequency using a standard peak-detection algorithm.

Following the series of preliminary characterization actions 1000-1002, or as the initial action if the preliminary actions are omitted, the method 100b may proceed with actions 101 through 104, which constitute the primary characterization method elaborated upon in relation to FIG. 1 and method 100a.

The analyzer module may transmit 101 a set of excitation signals to the probe. In accordance with one or more examples, these signals may be configured at a plurality of distinct frequencies within a frequency range that is below the first resonant frequency.

The analyzer module may receive 102 a set of reflected signals from the probe, which may be indicative of the interaction between the generated electrical field and the aqueous solution.

The analyzer module may process the received signals to determine 103 a rate of change of a reflection coefficient magnitude with respect to frequency. This metric, which may be derived from the sub-resonant frequency response, provides a robust basis for detailed characterization of the solution.

The analyzer module may identify 104 at least one characteristic of the aqueous solution based on the determined 103 rate of change. As previously described, this may involve, inter alia, determining a TDS concentration, assigning the solution to a safety category (e.g., potable/non-potable), normalizing the rate of change against a reference, or inputting the rate of change into a classification model to identify the presence and/or concentration of specific ionic contaminants.

The following examples are described for illustrative purposes and may be combined with the methods 100a and 100b as depicted in FIG. 1 and FIG. 2, respectively, as well as with other examples disclosed herein.

In one or more examples, the frequency range of the set of excitation signals transmitted to the probe comprises a range between 10 KHz to 700 MHz, inclusive. The frequency range may comprise a range between 1 MHz to 200 MHz, inclusive. The frequency range may, for example, comprise a range between 50 MHz to 150 MHz, inclusive.

In one or more examples, the sub-resonant frequency range is defined relative to the first resonant frequency of the probe system to account for variations in probe geometry and the baseline properties of the solution. The frequency range of the set of excitation signals may comprise a range between approximately 1% and approximately 15% of the first resonant frequency. In further examples, this range may be narrowed, for example, to between approximately 1% and approximately 10%, or between approximately 2% and approximately 9%. In one or more examples, the range is between approximately 2.5% and approximately 8% of the first resonant frequency. An exemplary range, based on experimental findings of a beneficial 50 MHz to 150 MHz range with a first resonant frequency of approximately 1.9 GHz, is between approximately 2.6% and approximately 7.8% of the first resonant frequency. Utilizing such a normalized range may ensure that the analysis is consistently performed within an optimal, substantially linear region of the system's response curve.

The selection of a specific frequency range may be based on the probe geometry, the expected range of solution conductivities, and the desired sensitivity. For instance, lower frequency ranges may be preferable for highly conductive solutions, whereas higher frequency ranges within the sub-resonant domain may offer enhanced sensitivity for solutions with low ionic content. The analyzer module may be configured to dynamically select or adjust the frequency range based on preliminary measurements.

In one or more examples, the determined rate of change is normalized against a reference rate of change. this normalizing comprises calculating a ratio of the determined rate of change to the reference rate of change. In further examples, the reference solution used to determine the reference rate of change is deionized water.

The use of a ratiometric analysis advantageously reduces the effects of system drift, such as variations in temperature or component aging, thereby enhancing the accuracy and reproducibility of the measurement. While deionized water serves as a convenient and stable baseline, other reference solutions with known characteristics, such as a standard saline solution of a specific molarity, could also be employed depending on the application.

In one or more examples, identifying at least one characteristic of the aqueous solution comprises monitoring a dilution process between at least a first liquid and a second liquid. The method further comprises performing the transmitting 101, receiving 102, and determining 103 at a first time to yield a first rate of change and at a second, subsequent time to yield a second rate of change. The method may then involve comparing the first rate of change and the second rate of change to determine a change in a dilution ratio of the aqueous solution.

The above example may be particularly applicable in industrial or laboratory settings for process control, such as monitoring the mixing of chemical reagents or ensuring the proper dilution of a concentrate. The measurements can be performed in real-time or at discrete intervals to provide continuous feedback on the state of the dilution process.

In one or more examples wherein the aqueous solution is assigned to one of a plurality of safety categories, the assigning comprises comparing the determined rate of change to at least one predetermined threshold value. The at least one threshold value is preferably correlated with a maximum permissible contaminant level, for example, as defined by a public health standard (e.g., from the Environmental Protection Agency or the World Health Organization).

In examples wherein the determined rate of change is used to determine a Total Dissolved Solids (TDS) concentration, classifying the aqueous solution comprises comparing the determined TDS concentration to a reference TDS range corresponding to potable water.

In one non-limiting example, the reference TDS range is below 500 parts-per-million (ppm).

These examples provide a direct and quantitative means for assessing water safety. The threshold values can be stored in a memory of the analyzer module and may be user-adjustable or pre-programmed according to specific regulatory standards. For example, a first threshold could correspond to an "excellent" or "potable" category, a second threshold to a "fair" or "use with caution" category, and a third to a "poor" or "non-potable" category.

In one or more examples, identifying 1000 the first resonant frequency comprises performing a preliminary sweep. This preliminary sweep may comprise transmitting a set of calibration signals to the probe arranged in the aqueous solution, wherein the set of calibration signals are selected to cause the probe to generate an electrical field at a plurality of distinct frequencies over a wider band that is expected to contain the resonance. The analyzer module receives a corresponding set of reflected calibration signals from the probe. Subsequently, the analyzer module processes the set of reflected calibration signals and the set of transmitted calibration signals to obtain the first resonant frequency, for instance, by identifying the frequency at which the magnitude of the reflection coefficient is at a minimum.

Figure 3:
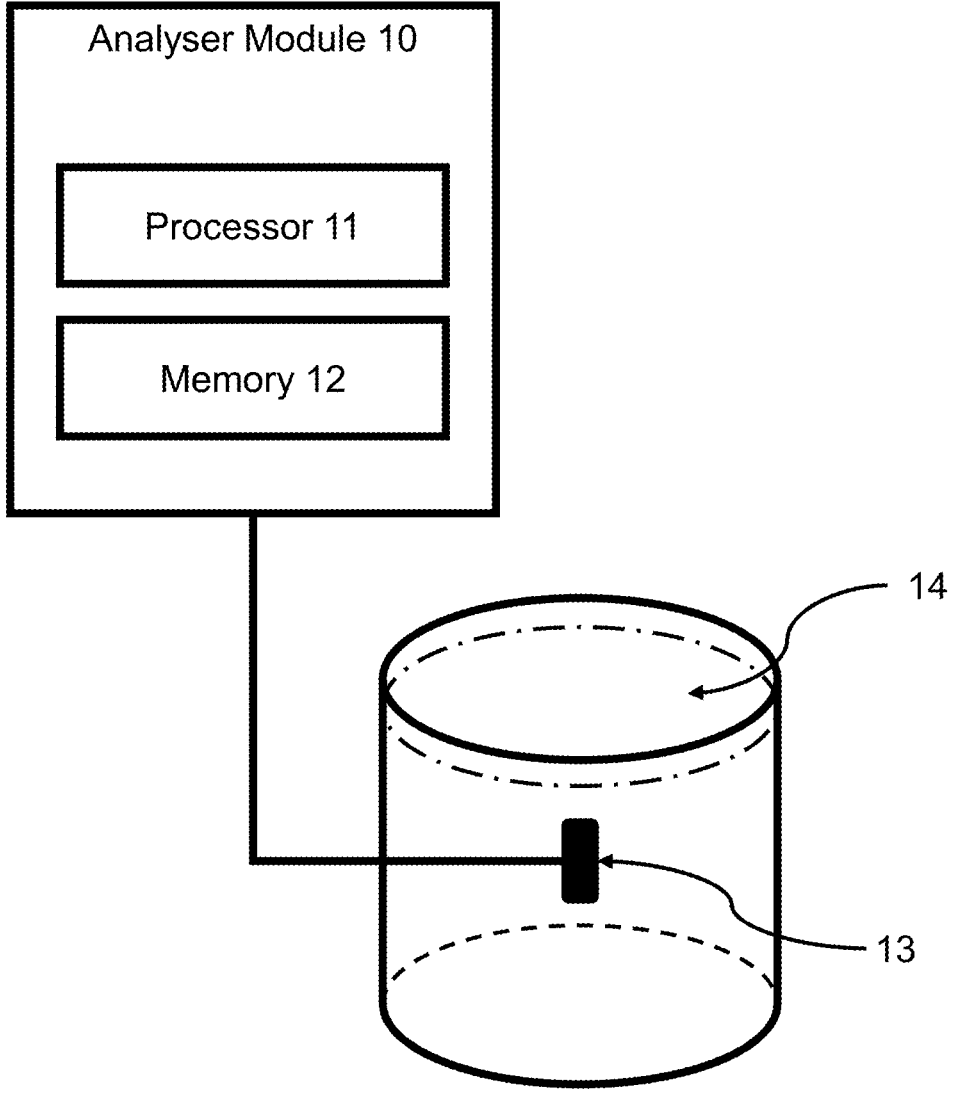
FIG. 3 is a block diagram illustrating an exemplary system for identifying at least one characteristic of an aqueous solution.

FIG. 3 illustrates an exemplary system for identifying at least one characteristic of an aqueous solution. The system may be configured to perform the functions, actions, and steps described in relation to the methods 100*a* and 100*b* illustrated in FIG. 1 and FIG. 2, respectively. The system comprises an analyzer module 10 that is operatively and communicatively coupled to a probe 13. The probe 13 is an electromagnetic sensor configured to be at least partially submerged in an aqueous solution 14 held within a suitable container. The analyzer module 10 includes at least one processor 11 communicatively coupled to a memory 12. The memory 12 is a non-transitory computer-readable medium storing machine-executable instructions.

The processor 11 is configured to execute the instructions stored in memory 12 to control the operations of the system. In operation, the processor 11 is configured to cause the transmission of a set of excitation signals to the probe 13. These signals are configured to cause the probe 13 to generate an electrical field within the aqueous solution 14 at a plurality of distinct frequencies within a frequency range below a first resonant frequency of the probe. The processor 11 is also configured to receive a set of reflected signals from the probe 13, which are indicative of the interaction between the electrical field and the aqueous solution 14.

Upon receiving the reflected signals, the processor 11 is configured to execute instructions to process the signals and determine a rate of change of a reflection coefficient magnitude with respect to frequency. Based on this determined rate of change, the processor 11 identifies at least one characteristic of the aqueous solution 14.

In one or more examples, the processor 11 is further configured by the instructions to perform additional functions. For example, the processor 11 may be configured to identify the first resonant frequency of the probe 13 while it is arranged in the aqueous solution 14 or a reference solution. The processor 11 may also be configured to analyze a resonant feature of the reflection coefficient to identify the aqueous solution 14 as highly saline when the feature is substantially attenuated compared to a reference.

To identify the at least one characteristic, the processor 11 may be configured to execute instructions to perform various analyses. In one or more examples, the processor determines a Total Dissolved Solids (TDS) concentration from the rate of change and bases the identified characteristic on this TDS value. This may involve assigning the aqueous solution 14 to a safety category, such as a potable category or a non-potable category. In one example, the processor 11 normalizes the determined rate of change against a reference rate of change, which may be predetermined for a reference solution and stored in the memory 12.

In one or more examples, the processor 11 is configured to identify the characteristic by using a classification model, which may also be stored in the memory 12. This model may store data correlating known reference characteristics with reference rates of change. The known reference characteristics can comprise concentrations of specific ionic contaminants, and the processor 11 can thereby identify the presence of at least one contaminant above a predefined safety limit. Non-limiting examples of such contaminants include a heavy metal, a nitrate, and a chloride.

With continued reference to FIG. 3, the probe 13 may be implemented in various configurations without departing from the scope of the present disclosure. In one non-limiting example, the probe 13 is an open-ended coaxial probe. Such a probe may comprise an inner conductor, an outer conductor, and a dielectric material separating the two, with the end of the probe that is submerged in the aqueous solution 14 being substantially planar. The conductors may be fabricated from a corrosion-resistant material, such as stainless steel (e.g., 316L), titanium, or a noble metal, while the dielectric may be a chemically inert polymer, for example, polytetrafluoroethylene (PTFE) or polyether ether ketone (PEEK). In other examples, the probe 13 may comprise other transmission line structures, such as a microstrip line, a coplanar waveguide, or a slotline antenna, configured to generate a fringing electric field that interacts with the aqueous solution 14. The geometry and materials of the probe 13 may be selected to optimize sensitivity within a desired frequency range and to ensure durability in the intended operational environment.

The analyzer module 10 may comprise a vector network analyzer, such as a Rohde & Schwarz vector network analyzer. The analyzer module 10 may comprise a plurality of radio frequency (RF) and digital components configured to execute the disclosed methods. In one or more examples, the processor 11 controls a signal generation circuit, such as a Voltage-Controlled Oscillator (VCO) coupled to a Phase-Locked Loop (PLL) or a Direct Digital Synthesizer (DDS), to produce the set of excitation signals. These signals may be routed through a directional coupler or a circulator, which serves to separate the transmitted excitation signals from the received reflected signals. The reflected signals may then be directed to a detection circuit, which may comprise, for example, a logarithmic amplifier, a diode detector, or a heterodyne receiver architecture, to convert the RF power of the reflected signal into a corresponding DC voltage or a lower intermediate frequency. An Analog-to-Digital Converter (ADC) may then digitize this signal for processing by the processor 11. The memory 12 may store, in addition to the executable instructions, calibration data, reference solution profiles, and one or more classification models.

Determining 103 the rate of change of the reflection coefficient magnitude with respect to frequency may be performed by the processor 11 using one of a plurality of numerical techniques. In one or more examples, the processor 11 computes the reflection coefficient magnitude, at each of the plurality of distinct frequencies based on the received reflected signals and known parameters of the transmitted signals. The resulting set of data points within the sub-resonant frequency range is then processed. The rate of change may be determined by performing a linear regression on the set of data points and taking the slope of the resulting best-fit line. In one or more examples, a finite difference method, such as a central difference or forward difference calculation, may be applied to adjacent data points to approximate the derivative. The determined rate of change may be an average rate of change over the entire frequency range or a rate of change calculated over a specific, smaller portion of said range, or the instantaneous rate of change at a particular frequency.

The classification model utilized in the identification 104 and generated in method 200 may take several forms. In one or more examples, the model may be a lookup table (LUT) stored in memory 12, wherein ranges of determined rates of change are mapped to specific solution characteristics or safety categories. In other examples, the correlation may be represented by a mathematical function, such as a multi-order polynomial, derived from fitting the data obtained from the reference solutions. In yet further examples, the classification model may be implemented using a machine learning algorithm. Non-limiting examples of suitable algorithms include Support Vector Machines (SVM), k-Nearest Neighbors (k-NN), Decision Trees, Random Forests, or an Artificial Neural Network (ANN). Such models, once trained on the data from the plurality of reference solutions as described in method 200, can classify an unknown aqueous solution by inputting its determined rate of change into the trained model and receiving a corresponding characteristic as an output.

Figure 4:
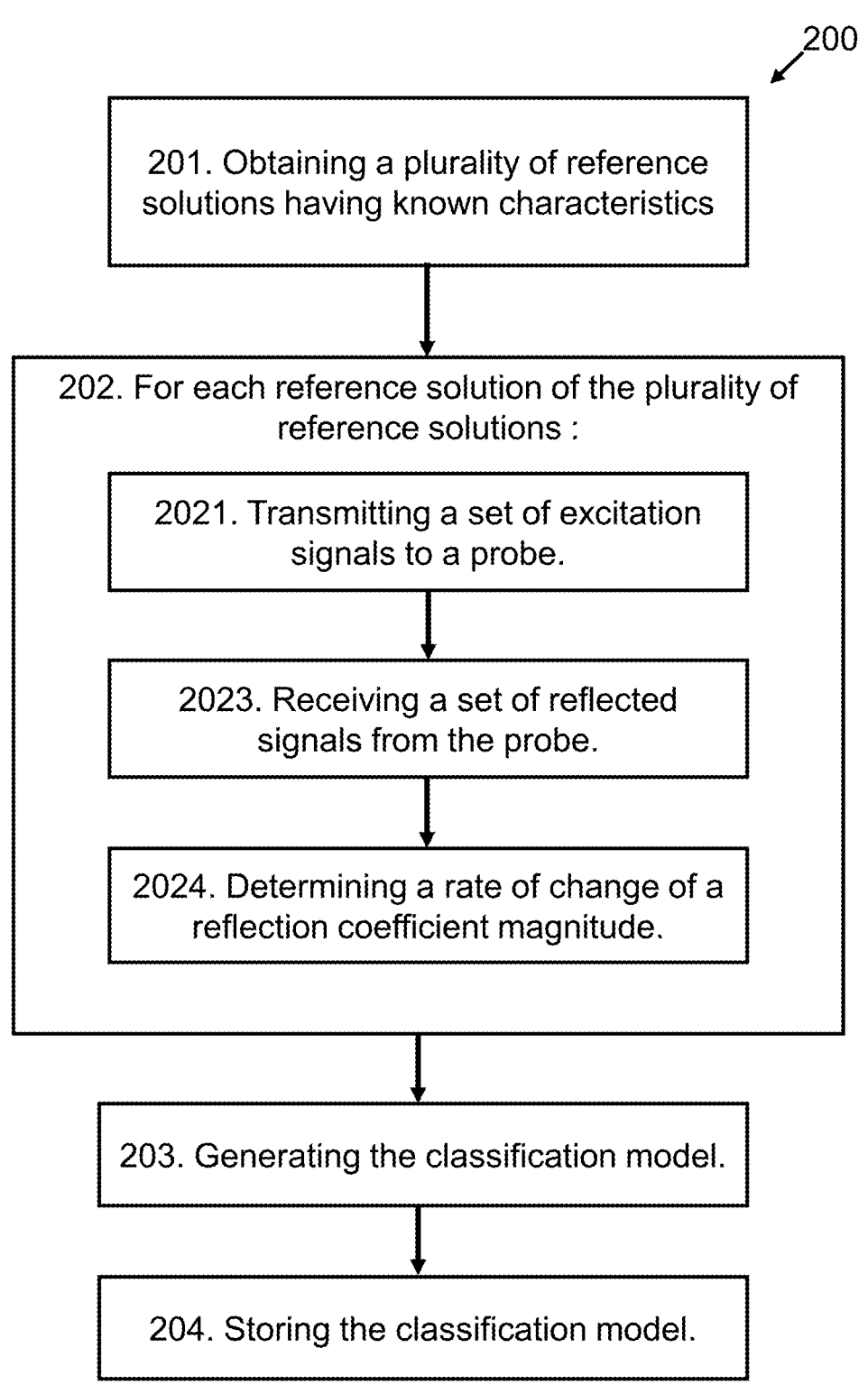
FIG. 4 is a flowchart illustrating an exemplary method for generating a classification model for use in identifying at least one characteristic of an aqueous solution.

FIG. 4 is a flowchart illustrating an exemplary method 200 for generating a classification model. The classification model generated by this method may be used by the analyzer module described in FIG. 3 to execute the identification 104 of the methods illustrated in FIG. 1 and FIG. 2.

The method 200 commences with obtaining 201 a plurality of reference solutions. Each reference solution in the plurality has at least one known reference characteristic. These characteristics may include, for example, known Total Dissolved Solids (TDS) concentrations or specific, known concentrations of various ionic contaminants such as heavy metals, nitrates, or chlorides.

An iterative measurement process 202 may be performed for each obtained 201 reference solution. Within this iterative process, an analyzer module may transmit 2021 a set of excitation signals to a probe that is submerged in the respective reference solution. The set of excitation signals may be configured to cause the probe to generate an electrical field at a plurality of distinct frequencies within a frequency range that is below a first resonant frequency of the probe.

The analyzer module may receive 2023 a set of reflected signals from the probe. These signals may be indicative of the interaction between the probe's electrical field and the specific reference solution being measured.

A processor of the analyzer module may then determine 2024 a corresponding reference rate of change of a reflection coefficient magnitude with respect to frequency. This determination 2024 may be based at least in part on the received 2023 set of reflected signals.

The completion of the iterative process 202 may result in a set of data pairs, with each pair comprising a known reference characteristic and its corresponding measured reference rate of change.

As depicted in FIG. 4, the classification model may be generated 203. This may be achieved by correlating the determined 2024 reference rate of change for each reference solution with the at least one known reference characteristic of that respective reference solution. This correlation may involve statistical analysis, machine learning algorithms, or the generation of a lookup table that maps specific rates of change (or ranges thereof) to specific solution characteristics.

Finally, the generated classification model may be stored 204 in a memory, such as the memory 12 of the analyzer module 10, which is communicatively coupled to the processor. Once stored, the model is available for use by the processor to analyze unknown aqueous solutions by measuring their rate of change and using the model to identify their characteristics.

FIG. 5 through FIG. 9 provide graphical representations of experimental data that illustrate the principles of the methods and systems disclosed herein. The data were obtained using a system generally corresponding to the system of FIG. 3, comprising an analyzer module and a probe, more specifically, the data was obtained using a Rohde & Schwarz vector network analyzer calibrated up to the probe tip using the Short-Load-Open-Thru (SLOT) technique. All samples were characterized under a stable ambient temperature of approximately 27° C.

Figure 5:
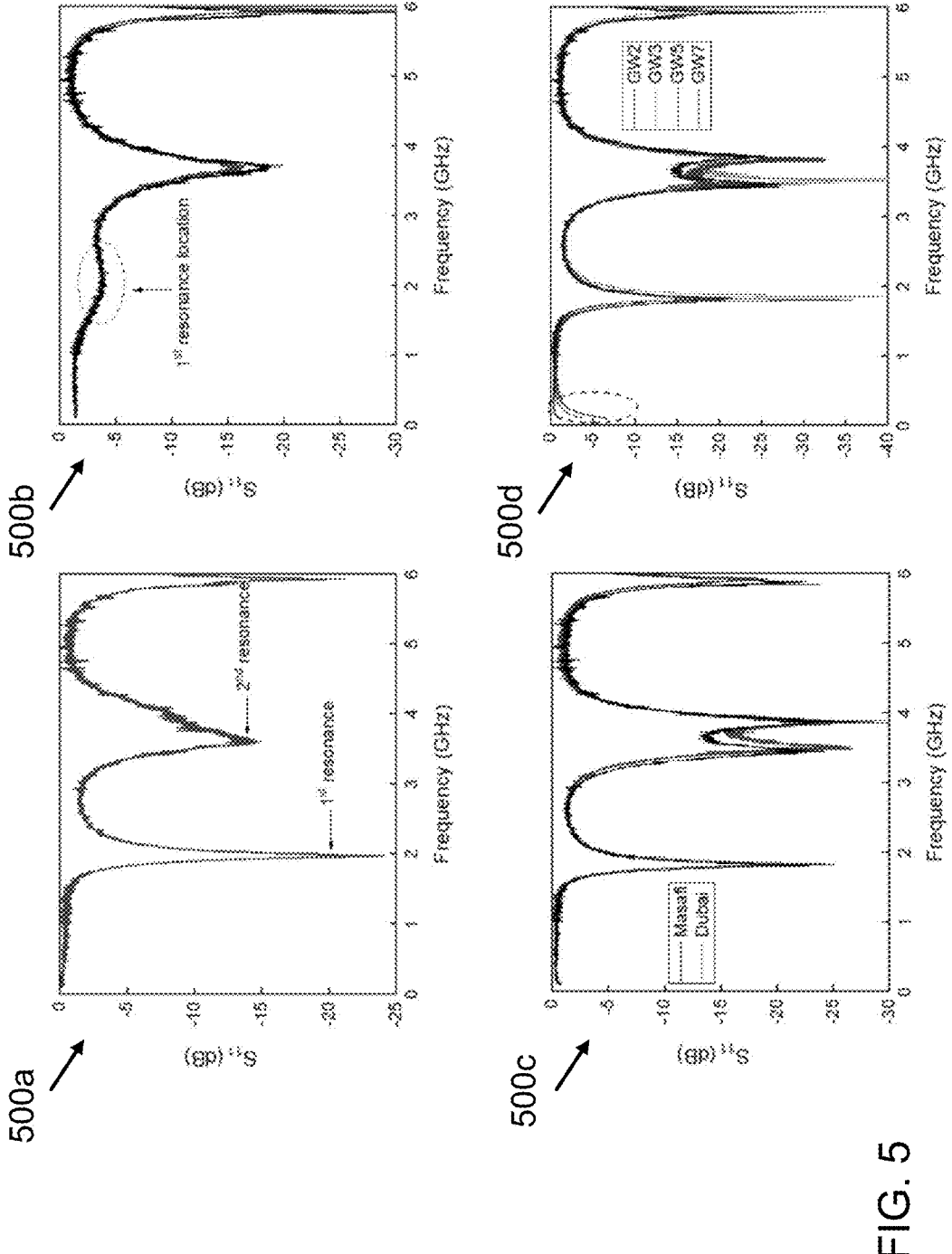
FIG. 5 shows graphical representations of experimentally measured reflection coefficient magnitudes as a function of frequency for a plurality of aqueous solutions, illustrating a resonant feature.

FIG. 5 provides graphical representations 500a, 500b, 500c, and 500d, showing experimentally measured reflection coefficient magnitudes as a function of frequency for several aqueous solutions. Plot 500a illustrates the response when the probe is arranged in a reference solution, in this case, deionized water. A clear minimum in the reflection coefficient magnitude is observed, which may be used in one or more examples to identify 1000 a first resonant frequency at approximately 1.9 GHz, as described in the one or more examples disclosed herein. Plot 500b illustrates the response for a highly saline aqueous solution, in this case, seawater. The resonant feature may be observed to be substantially attenuated when compared to the reference feature in plot 500a, providing a basis for identifying 1002 the aqueous solution as highly saline, as described in the one or more examples disclosed herein. Plots 500c and 500d show the responses for other aqueous solutions, including bottled water and groundwater samples, respectively, which exhibit distinct behaviors at frequencies below the first resonant frequency.

A number of factors may result in the resonance attenuation depicted in graph 500*b*. The presence of dissolved salts in seawater may result in greater electromagnetic wave absorption, leading to weaker resonance dips, and the higher dielectric loss tangent in seawater may cause more energy dissipation, reducing the sharpness of resonance. The impedance mismatching at the sensor interface may further diminish the reflection coefficient response, and mobile ions in seawater introduce screening effects, which may limit effective polarization and diminish the resonant effect.

Figure 6:
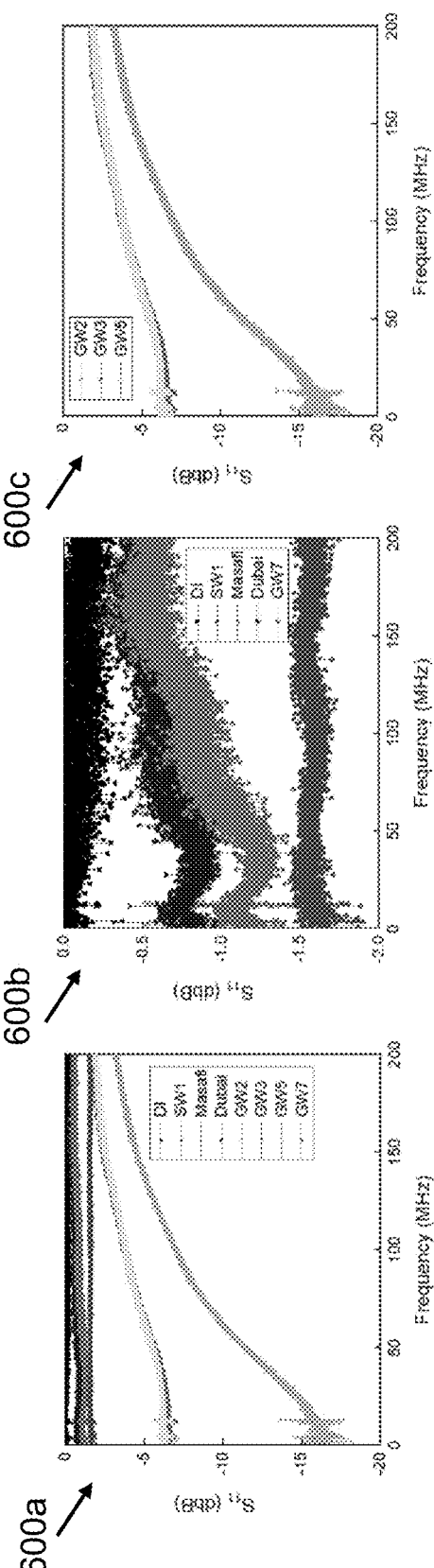
FIG. 6 shows graphical representations of measured reflection coefficient magnitudes as a function of frequency in a sub-resonant frequency range for a plurality of aqueous solutions.

FIG. 6 provides graphical representations 600*a*, 600*b*, and 600*c*, showing a detailed view of the measured reflection coefficient magnitudes at a plurality of distinct frequencies within a frequency range being below a first resonant frequency. Specifically, these plots show the response from 1 MHz to 200 MHz for various aqueous solutions. Data such as that depicted in FIG. 6 is processed by the analyzer module 10 to determine 103 a rate of change of a reflection coefficient magnitude with respect to frequency.

Figure 7:
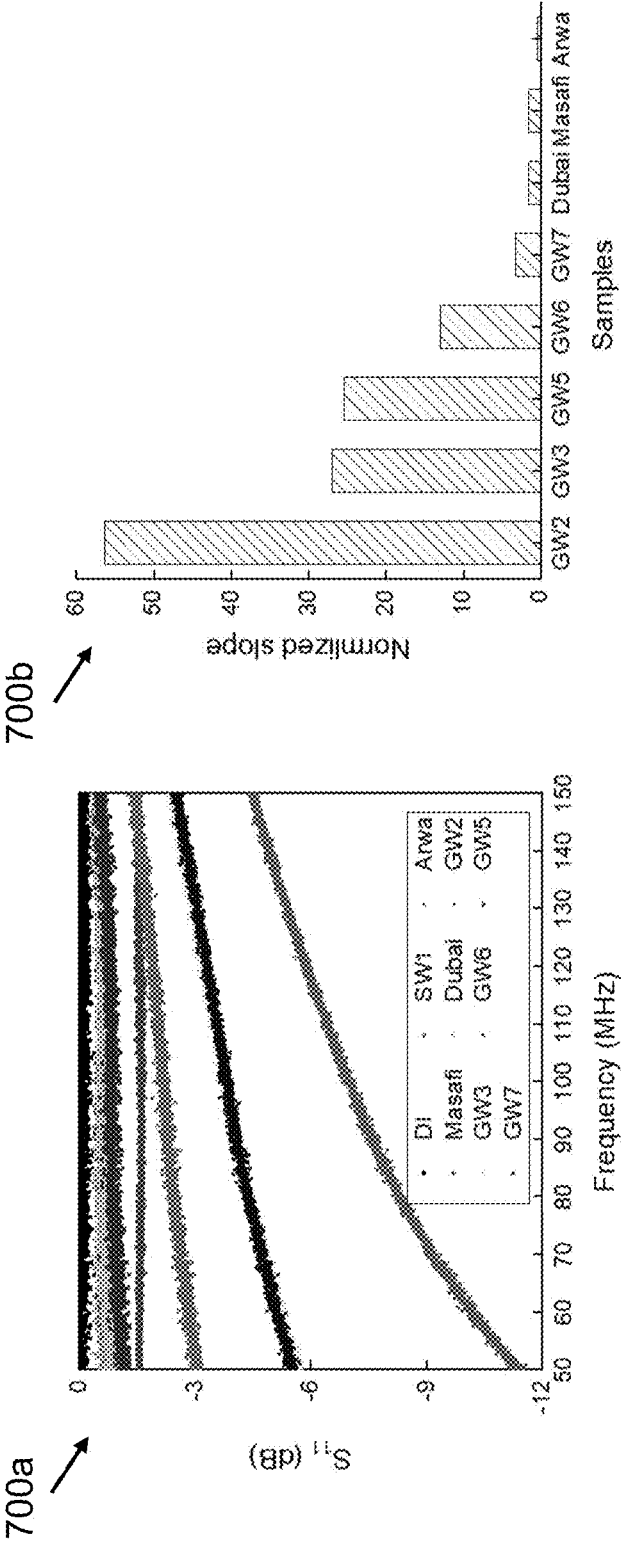
FIG. 7 illustrates an exemplary classification of aqueous solutions into a plurality of safety categories based on a normalized rate of change of a reflection coefficient magnitude.

FIG. 7 illustrates an example of identifying at least one characteristic of an aqueous solution based on the determined rate of change. Plot 700*a* shows a further detailed view of the frequency range between 50 MHz and 150 MHz, from which the rate of change may be determined. Plot 700*b* shows a plurality of determined rates of change that have been normalized against a reference rate of change obtained from a reference solution (deionized water). The normalized values shown in plot 700*b* are calculated by dividing the extracted slope of each sample by the extracted slope of the deionized water (DI) reference sample. Accordingly, the water quality ranking from best to worst is as follows: Arwa, Masafi, MaiDubai, GW7, GW6, GW5, GW3, and GW2, respectively. The normalized values provide a basis for assigning the aqueous solution to one of a plurality of safety categories. In one non-limiting example, the following thresholds are defined to classify solutions: below 5 for potable ("drinking") water; between 5 and 15 for non-potable water used for e.g., irrigation; and, above 15 for non-potable water used for e.g., outdoor cleaning. This use of thresholds may serve as one implementation of a classification model, as described in the one or more examples relating to the identification 104. The normalized values shown in plot 700*b* are derived from the raw extracted slopes, which are provided for reference in Table 1:

TABLE 1

| Extracted slopes (dB/MHz) | |
| --- | --- |
| Sample | Slope |
| DI | 1.1171E−9 |
| SW1 | 4.74502E−10 |
| GW2 | 6.30214E−8 |
| GW3 | 3.00665E−8 |
| GW5 | 2.83974E−8 |
| GW6 | 1.44933E−8 |
| GW7 | 3.72093E−9 |
| MaiDubai | 1.78673E−9 |
| Masafi | 1.73536E−9 |
| Arwa | 4.71475E−10 |

Figure 8:
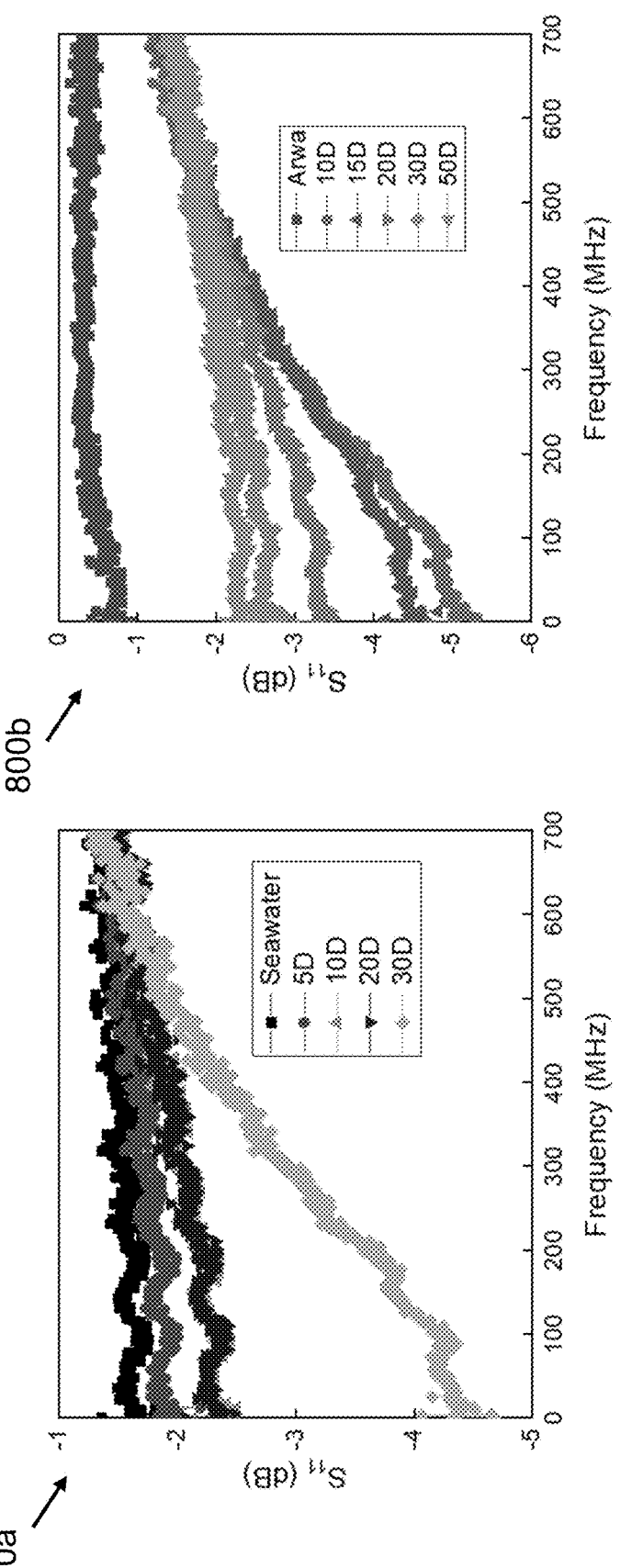
FIG. 8 shows graphical representations of measured reflection coefficient magnitudes as a function of frequency during a dilution process.

FIG. 8 provides graphical representations 800*a* and 800*b*, illustrating the sensitivity of the measured reflection coefficient magnitude to changes in the composition of an aqueous solution during a dilution process. A series of reflection coefficient profiles was measured as a first liquid was progressively diluted with a second liquid. The systematic and progressive shift in the profiles demonstrates that the set of reflected signals received by the analyzer module is a sensitive and reliable indicator of the aqueous solution's characteristics.

Notably, the diluted samples in FIG. 8 exhibit convergence around 700 MHz, indicating a shared electromagnetic response irrespective of the dilution ratio. Below this frequency, the measured profiles align consistently with the dilution gradient. The progressive reduction in ionic content may modulate the dielectric properties of seawater, yet its influence may remain dominant at lower dilution levels. In contrast, the introduction of seawater into fresh water induces a rapid shift in electromagnetic characteristics, leading to a more pronounced effect. These observations demonstrate the asymmetric nature of dilution, where seawater retains stability until significant dilution occurs, whereas fresh water undergoes immediate changes with even minor seawater additions.

Figure 9:
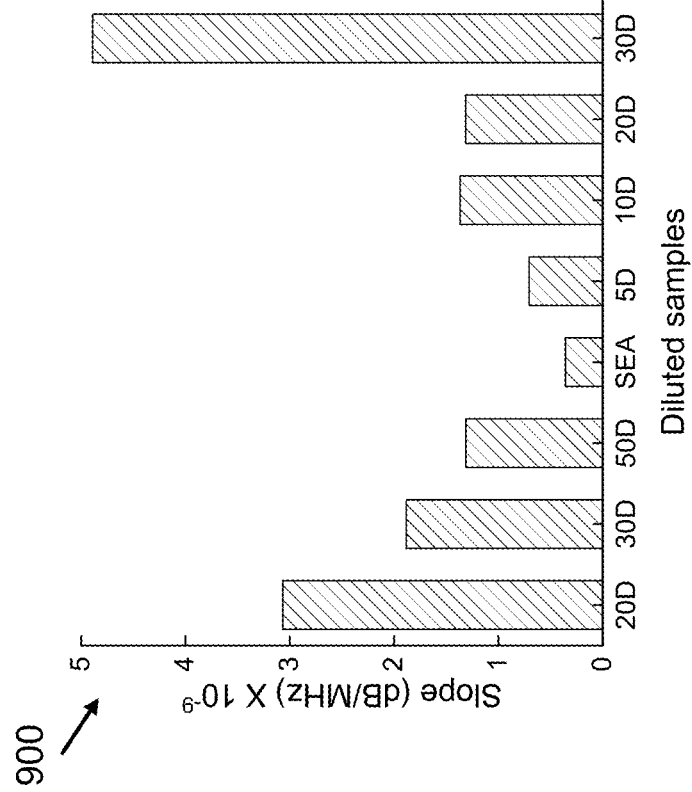
FIG. 9 is a graphical representation illustrating a determined rate of change of a reflection coefficient magnitude as a function of a dilution ratio.

FIG. 9 is a graphical representation 900 illustrating the determined rate of change as a function of the dilution ratio for the experiments shown in FIG. 8. The monotonic relationship between the determined rate of change and the concentration of the aqueous solution validates the use of this metric for quantitatively monitoring a process, such as a dilution process, and identifying characteristics of the solution in real-time.

The dielectric behavior of seawater, groundwater, and bottled water at different frequencies is influenced by particle size and ionic content. At high frequencies, bottled water, containing smaller particles and fewer ions, shows minimal polarization and stable dielectric response due to limited surface area for ion adsorption. In contrast, seawater, with larger aggregates, has reduced polarization, resulting in a lower dielectric constant and increased attenuation. At low frequencies, seawater's high ionic content and larger particles lead to pronounced interfacial polarization (Maxwell-Wagner-Sillars effect), enhancing its dielectric constant, while bottled water, with smaller particles and fewer ions, exhibits a weaker low-frequency response due to limited interfacial polarization.

To provide further context for the experimental results illustrated in FIG. 5 through FIG. 9, a plurality of aqueous solutions under test were characterized using a reference analytical method, namely Inductively Coupled Plasma Mass Spectrometry (ICP-MS), to determine the concentrations of specific cations, including without limitation, sodium ($Na^+$), potassium ($K^+$), calcium ($Ca^{2+}$), and magnesium ($Mg^{2+}$). The results of this characterization, providing a quantitative compositional basis for the samples under test, are summarized below in Table 2.

TABLE 2

| Concentrations of ions (mg/L) measured using ICP-MS. | | | | | |
| --- | --- | --- | --- | --- | --- |
| | | Ions [mg/L] | | | |
| Sample | Usage | $Na^+$ | $K^+$ | $Ca^{2+}$ | $Mg^{2+}$ |
| DI | Deionized water | 0 | 0 | 0 | 0 |
| SW1 | Sea water | 4720 | 491 | 282 | 935 |
| GW2 | Outdoor | 421 | 34 | 22 | 121 |
| GW3 | Outdoor | 141 | 3 | 3 | 110 |
| GW5 | Outdoor | 150 | 9 | 14 | 116 |
| GW6 | Irrigation | 51 | 4 | 19 | 36 |
| GW7 | Irrigation | 40 | 2 | 18 | 1 |

TABLE 2-continued

Concentrations of ions (mg/L) measured using ICP-MS.

| | | Ions [mg/L] | | | |
|---|---|---|---|---|---|
| Sample | Usage | Na$^+$ | K$^+$ | Ca$^{2+}$ | Mg$^{2+}$ |
| MaiDubai | Drinking | <1 | 75 | 16 | 7 |
| Masafi | Drinking | 6 | <1 | 3 | 18 |
| Arwa | Drinking | 1.4 | 9 | 1 | 20.7 |

As used herein, the 'first resonant frequency' refers to the fundamental self-resonant frequency of the probe system, which comprises the probe arranged in the aqueous solution. This frequency can be identified experimentally as the lowest frequency that produces a distinct minimum in the measured reflection coefficient magnitude. Operating below this frequency ensures the system is in a sub-resonant region, where the measured reflection coefficient is primarily indicative of the aqueous solution's properties rather than the probe's own resonant behavior.

As used herein, 'sub-resonant frequency range' refers to a range of frequencies below the first resonant frequency where the response of the reflection coefficient magnitude is substantially linear and is primarily indicative of the dielectric properties of the aqueous solution rather than the resonance characteristics of the probe system. For example, this may be a range between 1 MHz and 200 MHz when the first resonant frequency is approximately 1.9 GHZ.

As used herein, the 'rate of change of a reflection coefficient magnitude with respect to frequency' refers to the derivative $d|\Gamma|/df$, where $|\Gamma|$ is the reflection coefficient magnitude and f is the frequency. In practice, this may be determined as the slope of a best-fit line calculated via linear regression of the measured reflection coefficient magnitudes versus their corresponding frequencies over a specified sub-resonant frequency range.

As used herein, an aqueous solution is considered 'highly saline' if its concentration of total dissolved solids (TDS) or its electrical conductivity is sufficient to cause substantial attenuation of the probe's first resonant feature. For example, a solution with a TDS concentration greater than 3,000 parts per million (ppm), such as seawater, may be considered highly saline.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that the figures, such as FIGS. 1 to 9, comprise some features, circuitries, or operations which are illustrated with a solid line and some features, circuitries, or operations which are illustrated with a dashed line. Features, circuitries, or operations which are comprised in a solid line are features, circuitries, or operations which are comprised in at least one of the broadest examples. Features, circuitries, or operations which are comprised in a dashed line are examples which may be comprised in, or a part of, or are further features, circuitries, or operations which may be taken in addition to the examples illustrated in solid line. It should be appreciated that these operations need not be performed in the order presented. Furthermore, it should be appreciated that not all of the operations need to be performed. The example operations may be performed in any order and in any combination. Further, the claims may not recite all features or combinations disclosed herein. This disclosure, taken as a whole, describes examples that may not be claimed herein but to which the applicant is entitled, and which may be the subject of related applications.

It is to be noted that the word "comprising" does not necessarily exclude the presence of other elements, actions or steps than those listed.

It is to be noted that the words "a" or "an" preceding an element do not exclude the presence of a plurality of such elements.

It is to be noted that a list in the form of "at least one of A, B, or C, or any combination thereof" should be understood to mean "A", or "B", or "C", or "A and B", or "A and C", or "B and C", or "A and B and C".

It is to be noted that the term "indicative of" may be seen as "associated with", "related to", "descriptive of", "characterizing", and/or "defining". The terms "indicative of", "associated with", "related to", "descriptive of", "characterizing", and "defining" can be used interchangeably. The term "indicative of" can be seen as indicating a relation. For example, weight data indicative of weight may comprise one or more weight parameters.

It is to be noted that the word "based on" may be seen as "as a function of" and/or "derived from". The terms "based on" and "as a function of" can be used interchangeably. For example, a parameter determined "based on" a data set can be seen as a parameter determined "as a function of" the data set. A parameter or action may be determined or performed "based on" multiple inputs, items, or predicates. For example, a parameter or action may be "based at least in part on" a first input and "based at least in part on" a second input, which may or may not be expressly recited or claimed. In other words, the parameter may be an output of one or more functions with multiple inputs, including the data set as an input.

A function may be characterizing a relation between an input and an output, such as mathematical relation, a database relation, a hardware relation, logical relation, and/or other suitable relations.

It should further be noted that any reference signs do not limit the scope of the claims, that the disclosed examples may be implemented at least in part by means of both hardware and software, and that several "means", "units" or "devices" may be represented by the same item of hardware.

The various example methods and systems described herein are described in the general context of method actions, steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing actions and steps of the methods disclosed herein. The particular sequence of such executable instructions or associated data structures represents examples of corresponding acts for implementing the functions described in such actions, steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

What is claimed is:

1. A method, comprising:

transmitting, from an analyzer module, a set of excitation signals to a probe submerged in an aqueous solution, wherein the set of excitation signals is configured to cause the probe to generate an electrical field at a plurality of distinct frequencies;

receiving, at the analyzer module, a set of reflected signals from the probe, the set of reflected signals indicative of an interaction between the electrical field and the aqueous solution at the plurality of distinct frequencies;

determining, by the analyzer module, a rate of change of a reflection coefficient magnitude with respect to frequency based at least in part on processing the set of reflected signals from the probe;

identifying, by the analyzer module, at least one characteristic of the aqueous solution based on the determined rate of change, wherein the identified at least one characteristic of the aqueous solution is based on a TDS concentration determined by the rate of change.

2. The method of claim 1, wherein the set of excitation signals are configured to cause the probe to generate an electrical field at a plurality of distinct frequencies within a frequency range being below a first resonant frequency.

3. The method of claim 2, further comprising:

analyzing a resonant feature of a reflection coefficient magnitude as a function of frequency determined over a frequency interval encompassing the first resonant frequency of the probe arranged in a reference aqueous solution; and identifying the aqueous solution as highly saline when the resonant feature is determined to be substantially attenuated compared to a reference feature identified for the reference aqueous solution.

4. The method of claim 1, wherein identifying at least one characteristic of the aqueous solution comprises: assigning the aqueous solution to one safety category from a plurality of safety categories, the plurality of safety categories comprising a potable category and a non-potable category.

5. The method of claim 1, wherein identifying at least one characteristic of the aqueous solution further comprises: normalizing the determined rate of change against a reference rate of change, the reference rate of change being predetermined for a reference solution.

6. The method of claim 2, wherein identifying at least one characteristic of the aqueous solution comprises:

inputting the determined rate of change into a classification model, the classification model storing data indicative of a correlation between a plurality of reference rates of change and a corresponding plurality of known reference characteristics; and

outputting, from the classification model, the at least one characteristic of the aqueous solution based on a mapping between the determined rate of change and the stored data.

7. The method of claim 6, wherein the known characteristics of the reference solutions comprise concentrations of specific ionic contaminants, and wherein the identified at least one characteristic comprises the presence of at least one of the specific ionic contaminants above a predefined safety limit.

8. The method of claim 2, wherein the method further comprises:

identifying, by the analyzer module, the first resonant frequency of the probe arranged in the aqueous solution or a reference solution, or both.

9. A system, comprising: a memory storing instructions; and a processor communicatively coupled to the memory, wherein the processor is configured to execute the instructions to:

cause transmission of a set of excitation signals to a probe submerged in an aqueous solution, the set of excitation signals configured to cause the probe to generate an electrical field at a plurality of distinct frequencies;

receive a set of reflected signals from the probe, the set of reflected signals indicative of an interaction between the electrical field and the aqueous solution at the plurality of distinct frequencies;

determine a rate of change of a reflection coefficient magnitude with respect to frequency based on the set of reflected signals; and identify at least one characteristic of the aqueous solution based on the determined rate of change, wherein the identified at least one characteristic of the aqueous solution is based on a TDS concentration determined by the rate of change.

10. The system of claim 9, wherein the set of excitation signals is configured to cause the probe to generate an electrical field at a plurality of distinct frequencies within a frequency range being below a first resonant frequency.

11. The system of claim 10, wherein the processor is further configured to execute the instructions to:

analyze a resonant feature of a reflection coefficient as a function of frequency determined over a frequency interval encompassing the first resonant frequency of the probe arranged in a reference aqueous solution; and identify the aqueous solution as highly saline when the resonant feature is determined to be substantially attenuated compared to a reference feature identified for the reference aqueous solution.

12. The system of claim 9, wherein to identify the at least one characteristic of the aqueous solution, the processor is configured to execute the instructions to: assign the aqueous solution to one safety category from a plurality of safety categories, the plurality of safety categories comprising a potable category and a non-potable category.

13. The system of claim 9, wherein to identify the at least one characteristic of the aqueous solution, the processor is further configured to execute the instructions to: normalize the determined rate of change against a reference rate of change, the reference rate of change being predetermined for a reference solution and stored in the memory.

14. The system of claim 9, wherein to identify the at least one characteristic of the aqueous solution, the processor is further configured to execute the instructions to:

input the determined rate of change into a classification model stored in the memory, the classification model storing data indicative of a correlation between a plurality of reference rates of change and a corresponding plurality of known reference characteristics; and output, from the classification model, the at least one characteristic of the aqueous solution based on a mapping between the determined rate of change and the stored data.

15. The system of claim 14, wherein the known reference characteristics of the reference solutions comprise concentrations of specific ionic contaminants, and wherein the identified at least one characteristic comprises the presence of at least one of the specific ionic contaminants above a predefined safety limit.

16. The system of claim 10, wherein the processor is further configured to execute the instructions to:

identify the first resonant frequency of the probe arranged in the aqueous solution or a reference solution, or both.

17. The system of claim 9, wherein to determine the rate of change of the reflection coefficient magnitude with respect to frequency, the processor is further configured to execute the instructions to: perform a linear regression on a set of data points, each data point corresponding to a measured reflection coefficient magnitude at one of the plurality of distinct frequencies from the set of reflected signals; and, identify the slope of a best-fit line resulting from the linear regression as the determined rate of change.

18. A method for generating a classification model for an aqueous solution analyzer module, the method comprising:

obtaining a plurality of reference solutions, each reference solution having at least one known reference characteristic;

for each reference solution of the plurality of reference solutions:

transmitting, from the analyzer module, a set of excitation signals to a probe submerged in the reference solution, wherein the set of excitation signals are configured to cause the probe to generate an electrical field at a plurality of distinct frequencies;

receiving, at the analyzer module, a set of reflected signals from the probe; and determining, by a processor of the analyzer module, a corresponding reference rate of change of a reflection coefficient magnitude with respect to frequency based at least in part on the set of reflected signals;

generating the classification model by correlating the determined reference rate of change for each reference solution with the at least one known reference characteristic of the respective reference solution, wherein the at least one known reference characteristic of the respective reference solution is based on a TDS concentration; and storing the classification model in a memory communicatively coupled to the processor.

* * * * *